United States Patent [19]

Kuroda

[11] Patent Number: 5,576,084

[45] Date of Patent: Nov. 19, 1996

[54] OPTICAL RECORDING MEDIUM AND THE PRODUCING METHOD OF THE OPTICAL RECORDING MEDIUM

[75] Inventor: Mikiya Kuroda, Yokohama, Japan

[73] Assignee: Victor Company of Japan, Ltd., Yokohama, Japan

[21] Appl. No.: 335,905

[22] Filed: Nov. 8, 1994

[30] Foreign Application Priority Data

Nov. 11, 1993 [JP] Japan ................................. 5-305883

[51] Int. Cl.⁶ ............................................. B32B 3/00
[52] U.S. Cl. ..................... 428/64.1; 428/64.2; 428/64.4; 428/64.8; 428/913; 430/270.1; 430/270.11; 430/270.14; 569/275.2; 569/275.4; 569/283; 569/288
[58] Field of Search ................................. 428/64.2, 64.4, 428/64.7, 64.8, 913; 430/270, 495, 945, 270.1, 270.11, 270.14; 369/275.2, 275.4, 283, 288

[56] References Cited

U.S. PATENT DOCUMENTS

| 5,153,873 | 10/1992 | Spruit et al. | |
|---|---|---|---|
| 5,234,797 | 8/1993 | Satake | 430/338 |
| 5,246,758 | 9/1993 | Matsui | 428/64 |
| 5,284,691 | 2/1994 | Taniguchi | 428/64 |

FOREIGN PATENT DOCUMENTS

| 2-96926 | 4/1990 | Japan . |
| 3-292632 | 12/1991 | Japan . |
| 4-281218 | 10/1992 | Japan . |
| 4-319531 | 11/1992 | Japan . |
| 5-12673 | 1/1993 | Japan . |
| 5-12715 | 1/1993 | Japan . |
| 5-28535 | 2/1993 | Japan . |
| 5-73961 | 3/1993 | Japan . |
| 5-258345 | 10/1993 | Japan . |

OTHER PUBLICATIONS

Proceeding of the Third Sony Research Forum (1993) pp. 291–295. Title: A High Density Read–Only Optical Disk System Using Superresolution.

*Primary Examiner*—Patrick Ryan
*Assistant Examiner*—Elizabeth Evans
*Attorney, Agent, or Firm*—Michael N. Meller

[57] ABSTRACT

An optical recording medium for high density recording and reproducing has a transparent substrate formed with at least a series of information pits readable with a laser beam from an apparatus or formed with guide grooves for controlling operation of recording the information pits on the substrate and a masking layer provided on the transparent substrate for minimizing an effective spot diameter of the laser beam to pass through the masking layer. The masking layer has an optical transmittance reversely changeable corresponding to a change of temperature by being irradiated with the laser beam. The masking layer is made of a thermochromic material consisting of an electron donative color compound and an electron acceptant developer without polarized materials and is uniformly provided on the uneven transparent substrate formed with the information pits or the guide grooves by using a vacuum deposition method. As the electron acceptant developer, there are employed such organic materials as having electron acceptant developing function and decoloring function by a change of temperature.

11 Claims, 3 Drawing Sheets

OPTICAL RECORDING MEDIUM AND THE PRODUCING METHOD OF THE OPTICAL RECORDING MEDIUM

BACKGROUND OF THE INVENTION

1. Field of the Invention

The present invention relates to an optical recording medium for an optical recording and/or reproducing apparatus equipped with an optical pickup of a laser beam, and, particularly, relates to an optical recording medium for a high density recording and reproducing by employing a recording medium having a variable transmittance corresponding to the change of temperature to cause an effective spot diameter of the laser beam to be minimized.

2. Description of the Related Art

Recently, a possibility of high density recording of optical discs has been examined and various kinds of optical discs have been proposed.

A recorded mark smaller than a spot of a laser beam can be recorded on the optical disc by controlling a power of the laser beam. Thus, it is considered that the recording density of the optical disc: has no limitation in principle. The spot diameter of the laser beam when using a lens system, however, has a minimum limitation determined by focusing characteristics of the lens system. Thus, the possibility of the high recording density of the optical disc depends on the minimization of the spot diameter of the laser beam.

Generally, a reproducible repetition wavelength (recording wavelength) derived from the recorded marks is given by a relation of $\lambda/2NA$, wherein "$\lambda$" designates a wavelength of a light to be used and "NA" a numerical aperture of a lens.

As seen from the relation of $\lambda/2NA$, in order to discriminate and reproduce a shorter length or interval of the recorded marks, it is effective to employ a light having a shorter wavelength and/or a lens having a larger numerical aperture. However, it is difficult technically to produce a short-wavelength semiconductor laser and is not easy to install such a lens having a larger numerical aperture in the optical disc apparatus.

There has been proposed a high density recording and reproducing method employing an optical disc provided with an optical masking layer made of a variable optical transmittance (referred to as a variable transmittance hereinafter) material of which optical transmittance increases at a higher temperature by being irradiated with the laser beam and decreases at a lower temperature by being cooled in the atmosphere after the laser beam has passed through the layer as shown in FIG. 1.

FIG. 1 is a graph showing a relation between an intensity of light (i.e., temperature) and a transmittance in a variable transmittance material in the prior art.

Generally, an optical intensity distribution (referred to as an intensity distribution) of the laser beam used in the information recording and reproducing is given by Gaussian distribution and a temperature distribution thereof is given by approximately the same as the intensity distribution thereof.

FIG. 2 is a plan view for explaining a masking effect of a optical masking layer (referred to as a masking layer).

Referring to FIG. 2, a laser beam spot "P" is composed of an inner spot "A" coaxially including a center thereof and an outer spot "B" circularly surrounding the inner spot "A". Naturally, the light intensity of the inner spot "A" is larger than that of the outer spot "B". When such a laser beam "P" as mentioned in the above is irradiated on the variable transmittance material, a first irradiated area with the inner spot "A" only allows the laser beam to pass through due to its higher transmittance, on the other hand, a second irradiated area with the outer spot "B" prevents the laser beam from passing through because of a lower temperature unlike the first irradiated area, thus, a masking effect occurs.

FIG. 3 is a graph showing a relation between an irradiated spot diameter and an effective spot diameter of the laser beam.

Referring to FIG. 3, a numeral 21 designates a light intensity distribution of the an irradiated laser beam "P" and 22 a light intensity distribution of the inner spot "A". A spot diameter "De" of the inner spot "A" (referred to as an effective spot diameter) passing through the first irradiated area of the variable transmittance material layer becomes substantially smaller than an irradiated spot diameter "D" of the laser beam "P". Therefore, it is possible to minimize cross-talks between neighboring tracks of a series of information pits (recorded marks) and between neighboring information pits by providing the variable transmittance material layer (referred to as a masking layer hereinafter) in an overlayed state on the optical disc because the first irradiated area with the inner spot "A" only allows the laser beam to pass through the masking layer and the second irradiated area with the outer spot "B" prevents the the laser beam from passing therethrough.

As one of requirements for the masking layer, the masking layer needs to have speedy changeability and recovery of the transmittance in response to the irradiation of the laser beam. Specifically, when the optical disc is rotated and a laser beam is irradiated thereon for reproducing, the transmittance of the first irradiated area on the masking layer has to be changed large enough to allow the laser beam to pass therethrough while the laser beam is being irradiated on the rotating optical disc, and the change of transmittance thereof has to be recovered before the first irradiated area returns to the position of the laser beam again due to a disc revolution.

As the variable transmittance material substantially satisfying such a requirement, a multicomponent type thermochromic material is well known and the optical recording medium utilizing the above material is disclosed in Japanese Patent Laid-Open 6-162564/1994. As the multicomponent type thermochromic material, there is disclosed, for example, in Japanese Patent Laid-Open Publication 50-75992/1975 a three-component type thermochromic material composed of an electron donative color compound (leuco dye) as a dye reductant, an electron acceptant developer (simply referred to as a developer) as a solid-state acid and a polarized compound.

In the above multicomponent type thermochromic material, coloring, decoloring and color-change occur by exchange of electrons between the electron donative color compound and the electron acceptant developer. Generally, it is considered, however, that neither the decoloring nor a thermochromic phenomenon (reversibility) occurs as long as employing only these two kinds of compounds even when the temperature changes, because the exchange of electrons always occurs between the electron donative color compound and the electron acceptant developer irrespective of a change of temperature.

When a plastic polarized compound is mixed to these two kinds of compounds, the decoloring occurs at a temperature higher than a predetermined temperature by being heated due to the exchange of electron corresponding to the thermal equilibrium, and the coloring and the color-change occur at the room temperature, i.e., the thermochromic phenomenon (reversibility) is presented.

The multicomponent type compound has such features that a light absorbing wavelength range can be selected by altering the structure of the electron donative color compound, and the temperatures, i.e., threshold values, of the coloring, decoloring, and color-change can be optionally selected by altering the structure of the polarized compound.

As other examples of the thermochromic material than the above three-component type thermochromic material mixed with the plastic polarized compound for the reversibility, there are ones of which reversibilities are controlled by thermal energy or ones of which coloring and decoloring are performed by a phase-transformation of the developer as seen in the thermochromic materials used in thermographic papers.

In the thermochromic material of which reversibility is controlled by thermal energy, an amphoteric developer having both properties of the acidic group and the basic group is employed. The coloring density of this material changes corresponding to the thermal energy supplied and shows a maximum value at a certain level of supplied thermal energy, and after that, it decreases when the thermal energy larger than the certain level is applied. Thus, the coloring thereof is performed by cooling it rapidly after having heated it at the maximum value, and the decoloring thereof is performed by cooling it slowly after having heated it again at the maximum value.

In the thermochromic material of which coloring and decoloring occur due to a phase-transformation of the developer, there is a developer having a long chain structure. In this case, the coloring thereof is performed by cooling rapidly after having heated it at a maximum value, and the decoloring thereof is performed by cooling it slowly after having heated it again at the maximum value as well as the above case.

In the above mentioned thermochromic material employing the amphoteric developer or the long chain structure developer, the developer has the function of the decoloring, thus, the transmittance of the thermochromic material can be reversely changed by employing only the two component material, i.e., a two-component type thermochromic material composed of the electron donative color compound and the electron acceptant developer without the plastic polarized material. Thus, it have an advantage that the coloring density thereof can be made larger.

However, the above three-component type thermochromic material has a drawback that its coloring density is smaller because it requires much quantity of the polarized material to be contained for generating the decoloring effect. Thus, the above three-component type thermochromic material needs a very thick masking layer to cause the coloring, the decoloring and the color-change sufficiently, i.e., to enhance the light absorption effect of the masking layer. The larger the thickness of the masking layer, the less transparent the masking layer becomes, which poses a problem of degrading the S/N of the reproduced signal waveform.

On the other hand, the above two-component type thermochromic material employing the amphoteric developer or the long chain structure developer has an advantage that the coloring density thereof can be made larger without employing the plastic polarized material. Thus, the masking layer can be made thinner. However, there are drawbacks that the reaction speed thereof is too slow, so that the change of the transmittance thereof does not occur within the laser irradiated area or the change of transmittance thereof do not recover before the irradiated area returns to be re-exposed to the laser beam again due to the disc rotation. Further, it needs heating both in coloring and decoloring. In addition, upon coloring and decoloring, it needs temperature controls including rapid cool down and gradual cool down.

As a countermeasure thereof, for instance, it may be considered to employ plural laser beam spots or an elliptic laser beam spot or an elongated laser spot in the direction of an array of recorded pits, which poses a problem that the apparatus becomes too complicated. Accordingly, the two-component type thermochromic material mentioned above or the long chin structure is not feasible as the masking layer.

In order to provide the above mentioned 3-component thermochromic material layer on the optical disc, it is advantageous to employ a spin-coat method suited for forming a thick layer in the aspect of productivity thereof. Generally, in the spin-coat method, a liquid coating material is dropped on a rotating disc surface, and the dropped material is spread over the surface due to the centrifugal force coating the surface uniformly along thereof including contours if any. Because of this principle, it is difficult to form the masking layer of an uniform thickness on the uneven optical disc having pits and lands by the spin-coat method. Specifically, the pits and guide grooves form recessed portions on a substrate of the optical disc and the substrate itself forms a flat portion (land) except for the pits and the guide grooves. The thickness of the masking layer formed on the recessed portions is different from the thickness thereof formed on the flat portion, thus, the uniform thickness of the masking layer can not be obtained by the spin-coat method. The uneven thickness of the masking layer causes differences of an optical path length, optical and thermal characteristics between the flat portion and the recessed portions, which poses impossibility of obtaining precise reproducing signals.

Especially, the sizes of the pits and the guide grooves formed in a high density recording optical disc are made smaller than those of the ordinary optical discs practically used. In that case, the pits and the guide grooves may be filled with the masking material by the spin-coat method, which will lead to impossibility of reproducing of information signals from the optical disc.

SUMMARY OF THE INVENTION

Accordingly, a general object of the present invention is to provide a novel and useful optical recording medium and a producing method of the recording medium in which the above disadvantage has been eliminated.

A more specific object of the present invention is to provide an optical recording medium comprising a transparent substrate having at least a series of information pits provided thereon, said series of information pits being able to be read out as reproducing signals by being irradiated with a laser beam from an apparatus and a masking layer provided on the transparent substrate for minimizing an effective spot diameter of the laser beam to pass through the masking layer, said masking layer having a transmittance reversely changeable corresponding to a change of temperature by being irradiated with the laser beam, said masking layer is made of a thermochromic material consisting of an electron donative color compound and an electron acceptant developer.

Another specific object of the present invention is to provide an optical recording medium comprising a transparent substrate having guide grooves for controlling operation of recording a series of information pits which can be read out as reproducing signals by being irradiated with a laser beam from an apparatus and a masking layer provided on the transparent substrate for minimizing an effective spot diameter of the laser beam to pass through the masking layer, said masking layer having a transmittance reversely changeable corresponding to a change of temperature by being irradiated with the laser beam, said masking layer is made of a thermochromic material consisting of an electron donative color compound and an electron acceptant developer.

DETAILED DESCRIPTION OF THE PREFERRED EMBODIMENTS

A description is given of an embodiment of the present invention referring to accompanying drawings.

Figure 4:
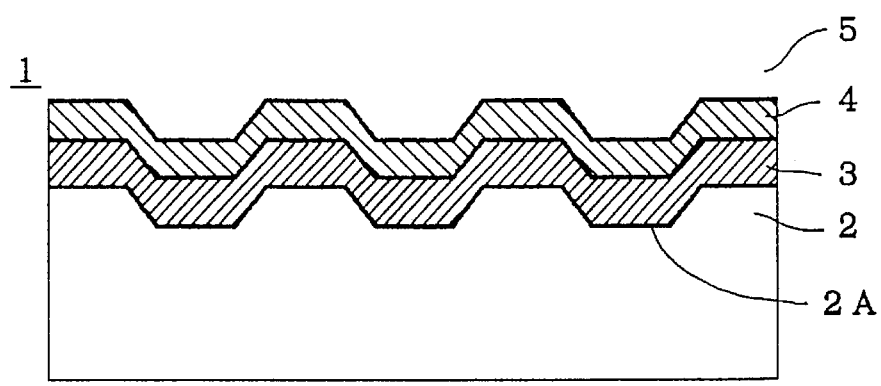
FIG. 4(A) is a sectional view showing a reproducing optical disc of an embodiment of the present invention.
FIG. 4(B) is a sectional view showing a recordable optical disc of an embodiment of the present invention.
Figure 4:
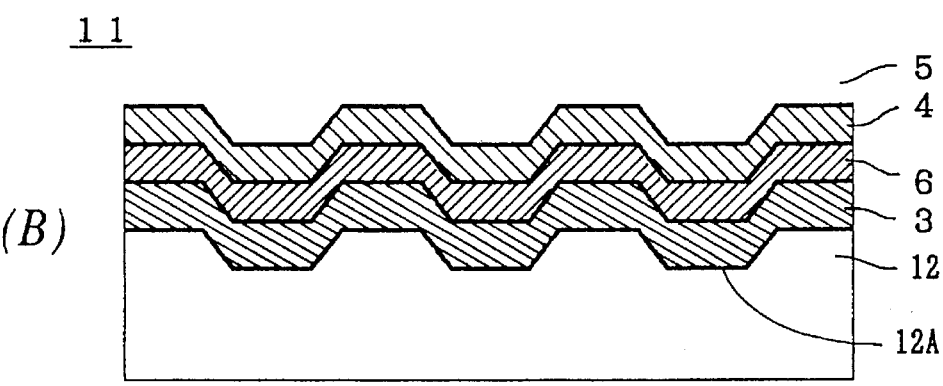

FIG. 4(A) is a sectional view showing a reproducing optical disc of an embodiment of the present invention and FIG. 4(B) is a sectional view showing a recordable optical disc of an embodiment of the present invention.

In FIG. 4(A), a reproducing optical disc 1 of an embodiment of the present invention comprises a transparent substrate 2 on which information pits 2A readable with a laser beam are formed, a masking layer 3 for minimizing an effective spot area of the laser beam irradiated from the bottom thereof to substantially pass through the masking layer, a reflecting layer 4 made of aluminum and a protecting layer 5 stacked in this order.

In FIG. 4(B), a recordable optical disc 11 comprises a transparent substrate 12 on which guide grooves 12A are concentrically or spirally formed, the masking layer 3, a recording layer 6 made of a recordable and reproducible material, the reflecting layer 4 and the protecting layer 5 stacked in this order.

Both the optical discs 1 and 11 shown in FIGS. 4(A) and 4(B) are light reflecting type optical discs, however, a light transmittance type optical disc having no reflecting layer 4 can be also employed in the present invention. Further, an adiabatic layer, an enhancement layer and a dielectric layer can be optionally employed in the optical discs of the present invention.

Next, a description is given of the masking layer 3.

As mentioned in the foregoing, upon forming the masking layer 3 having the uniform thickness on the uneven optical disc, it is advantageous to employ a vacuum deposition method which has excellent controllability of a thickness of a thin layer. The masking material made from organic compounds needs to be deposited on the optical disc without degradation of characteristics by the vacuum deposition method and need to have an enough masking effect even when it is a thin layer. Further, it is desirable to be a solid state in the room temperature.

In order to obtain a sufficient masking effect even when the masking layer is very thin, it needs to employ a thermochromic material having a high coloring density and a speedy changeability of transmittance accordingly with the change of temperature unlike the above mentioned thermochromic material containing such as the amphoteric developer or the long chain structure developer and the multi-component type thermochromic materials which requires the polarized compounds.

In addition, it is necessary for the thermochromic material to allow the masking layer to be formed with the vacuum deposition method on the uneven substrate.

Generally, a material has a fusing point at which it changes from solid to liquid, a boiling point at which it changes from liquid to gas or a sublimating point at which it changes from solid to gas, inherently. Further in the chemical compound, there occurs a decomposition where the chemical compound is separated into simple molecules and atoms by being heated at a certain temperature.

Thus, the chromic materials adaptable in the vacuum deposition method are limited to ones having the sublimating points or boiling points and they need to be evaporated in a molecule state or a cluster state (an assembled state of some molecules) at a lower temperature than a decomposition temperature thereof. Preferably, the boiling points or the sublimating point thereof is apart from the decomposition temperature thereof.

Further, other requirements that the masking layer 3 has to satisfy are that the transmittance thereof is to be reversely changed corresponding to ON and OFF of the laser beam and its response is to be fast with respect to the changeability and the recoverableness thereof.

The inventor of the present invention dynamically studied the electron acceptant developers suited for the masking layer 3 taking account of the above requirements. As the results of his studying, he discovered bisphenol type developers and hydroxynaphthalene type developers as the electron acceptant developer of the thermochromic material suited for the masking layer 3.

Specifically, as to the bisphenol type developers, there were ether type bisphenol, thioether type bisphenol, bisphenol S, bisphenol S derivatives, bisphenol A, bisphenol A type compounds, bisphenol A derivatives, and as to the hydroxynaphthalene type developers, hydroxynaphthalene.

The general structural formulas of the thermochromic materials of the present invention are shown with structural formulas (1)~(6) as follows:

In the following structural formulas (1)~(6), R1~R5 and R1'~R5' (in the formula (6), R1~R4 and R1'~R4') respectively have to be a substitution group selected among H, OH, aliphatic hydrocarbon (preferably, aliphatic hydrocarbon of C1~C6) and aliphatic polycyclic hydrocarbon, and, at least, one of R1~R5 and R1'~R5' have to be an OH group. One of the OH groups may be an —OR group (R designates C1~C6).

R6 and R6' in the formula (3) have to be substitution groups selected among H, aliphatic hydrocarbon (preferably, aliphatic hydrocarbon of C1~C6) and aliphatic polycyclic hydrocarbon.

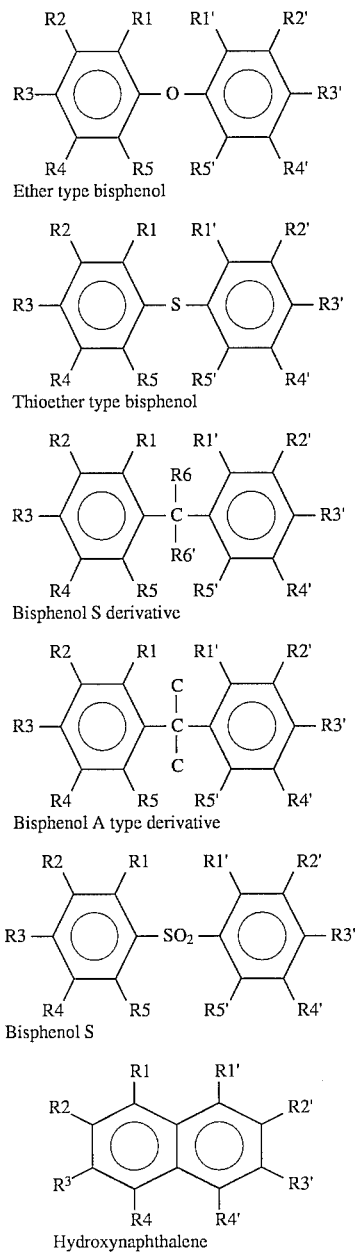

The inventor of the present invention discovered through his experiments that the above mentioned bisphenol type developer or hydroxynaphthalene type developer had decoloring function by causing it to combine with the electron donative color compound with increasing of temperature, i.e., the two component thermochromic compound had a decoloring function, which had never been conceived so far. Further, each of the transmittance changes of the above two component thermochromic compounds had not a large hysteresis characteristic unlike the amphoteric developer and the long chain structure developer. Specifically, they showed coloring in the room temperature and decoloring in the higher temperature and returned to the initial state, i.e., coloring in the room temperature, without applying such temperature controls as cooling down rapidly or gradually. Further, decoloring was able within an irradiated area of the laser spot because their reactive responses were speedy, which permitted uses of the conventional lens system and the apparatus. Furthermore, it was able to reduce the thickness of the masking layer 3 without degradation of the coloring, thus the masking layer 3 showed an excellent transparency at the decoloring. It will be understood that the bisphenol type developer and the hydroxynaphthalene type developer are suitable materials for the masking layer 3.

The thickness of the above masking layer 3 is determined by the inherent light absorption of the thermochromic material. The light absorption depends on the coloring density of the thermochromic material. In other words, the thermochromic material having a small coloring density needs a thick masking layer 3, however, the thermochromic material having a large coloring density allows a thin masking layer 3. Thus, the thickness of the masking layer 3 employing the above thermochromic material can be optionally determined by the kind of the thermochromic material to be used.

Further, as the above electron donative color compounds, there are employed fluoran type compounds, spiropirane type compounds, leuco-auramin type compounds, acyl-auramin type compounds, aryle-auramin type compounds, rhodamine B lactam type compounds, diaryle-phthalide type compounds, indolyl phthalide type compounds, poly-arylecarbinol type compounds, indoline type compounds and phenothyazine type compounds.

The masking layer 3 of the present invention is made of the thermochromic material composed of the above mentioned two components, i.e., the electron acceptant developer and the electron donative color compound.

Each of the above mentioned electron acceptant developers has a sublimating point or a boiling point. In order to examine the degradation of the thin layer formed by the vacuum deposition method, these electron acceptant developers were evaluated in the following experiments.

A description is given of examples of the experiments.

Each of experimental samples was made by forming a masking layer having thickness of 200 nm~400 nm by causing GN-169 (fluoran type compound: Yamamoto Chemicals) as the electron donative color compound and a material shown with a formula (7) (the thioether type bisphenol) described hereinafter as the electron acceptant developer to be deposited on a flat polycarbonate substrate in a weight ratio of 1:3 by using the vacuum deposition method ($10^{-5}$ mbar, resister heating), and by forming a protection layer of photopolymer EX704 (Dainippon Ink) on the masking layer by using the spin-coat method.

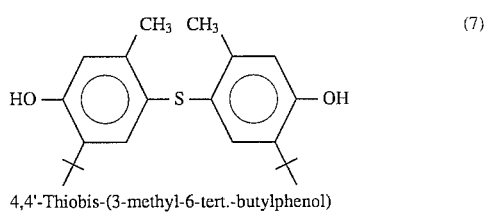

4,4'-Thiobis-(3-methyl-6-tert.-butylphenol)

A relation between a light intensity of the laser beam and a transmittance of the masking layer was examined by irradiating the laser beam on each of the experimental samples.

Figure 1:
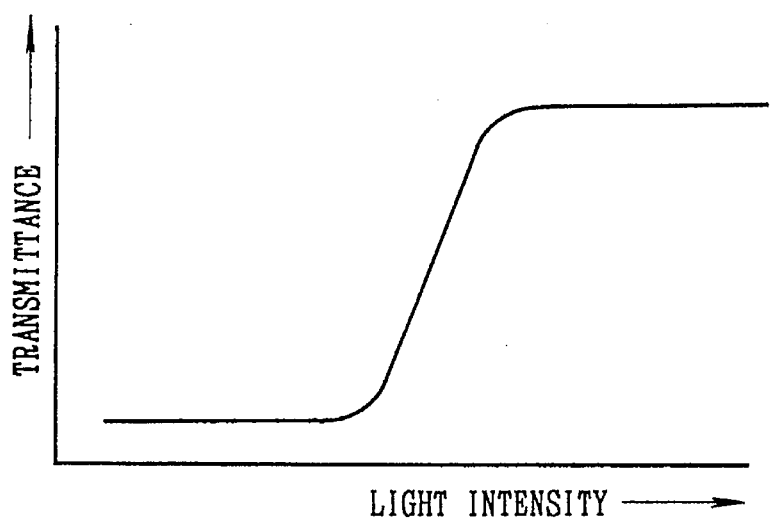
FIG. 1 is a graph showing a relation between a light intensity of a laser beam and a transmittance of a masking layer.

The transmittance of each of the samples was inversely changed corresponding to the intensity of the light as well as that of the prior art shown in FIG. 1. The effective spot diameters (inner spot diameter) obtained were estimated to be ½~⅔ as small as the diameter of the irradiated laser beam by a simulation method.

Further, a stationary response characteristic of the masking layer on each of the samples was examined by irradiating a laser beam having a center wavelength of 690 nm for 8 μs, i.e., by irradiating a laser beam pulse having a pulse width of 8 μs, on the fixed samples.

Figure 5:
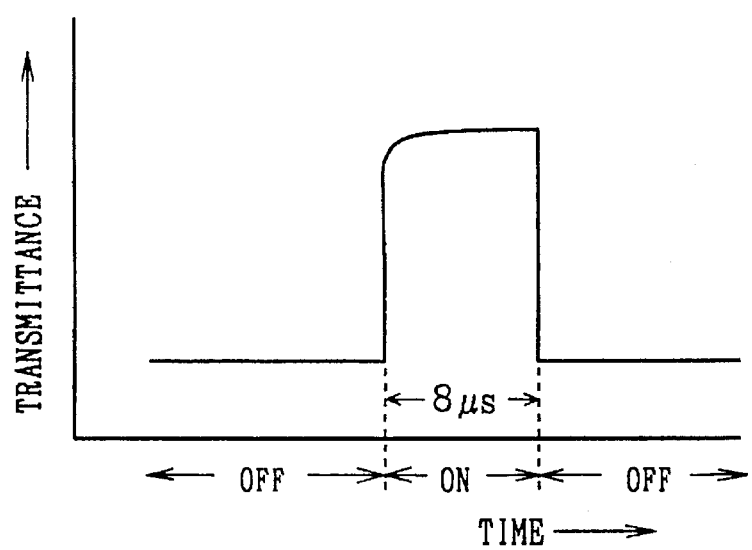
FIG. 5 is a graph showing an example of a stationary response characteristic of the masking layer in the present invention.

FIG. 5 is a graph showing an example of a stationary response characteristic of the masking layer in the present invention.

In the central portion irradiated with the laser spot, the transmittance of the masking layer was changed and the stationary response characteristic was excellent as shown in FIG. 5.

Furthermore, in order to examine a dynamic response of the above mentioned masking layer, a sample disc was made by providing the above mentioned masking layer on a disc type substrate having guide grooves without information pits, a reflective layer made of aluminum on the masking layer and the protecting layer on the reflective layer in this order.

The sample disc was rotated at a track linear speed of 3 m/s and was irradiated by a series of laser beam pulses each having a width of 400 ns. An overall intensity of the reflected light was measured as shown in FIG. 6.

Figure 6:
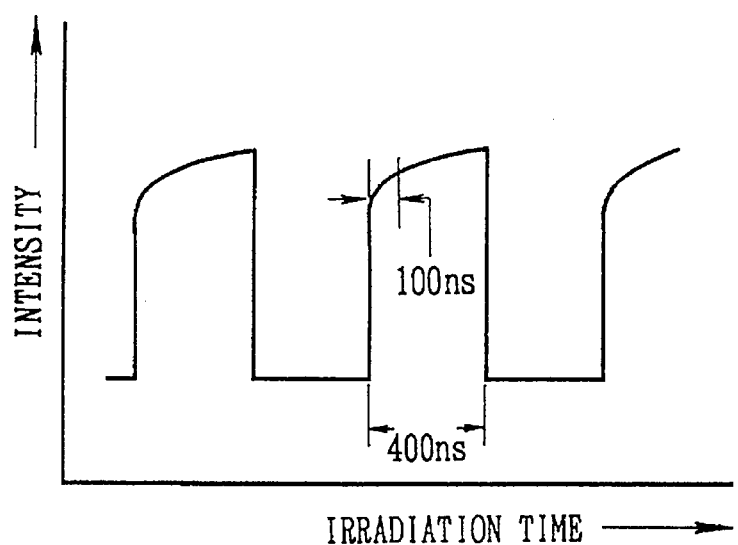
FIG. 6 is a graph showing an example of a dynamic response characteristic of the masking layer in the present invention.

FIG. 6 is a graph showing an example of a dynamic response characteristic of the masking layer in the present invention.

As seen from FIG. 6, the overall intensity of the reflected light had increased with elapsed time, in other words, the transmittance of the masking layer was increased within 100 ns after the laser beam had been irradiated, otherwise, i.e., when the masking layer is not provided, the intensity of the reflected light will be observed as a rectangular shape.

When a diameter of the laser beam spot is determined to be 1 μm and the disc is rotated at a track linear speed of 1.2 m/s, it takes 833 ns for the initially irradiated portion by the laser beam to pass the diameter of 1 μm by the rotation of the disc, likewise, at 3.0 m/s it takes 333 ns, at 5.0 m/s 200 ns, and at 10 m/s 100 ns. Thus, it will be understood that the response speed within 100 ns is fast enough to cause a rear-aperture type masking effect shown in FIG. 7.

Figure 7:
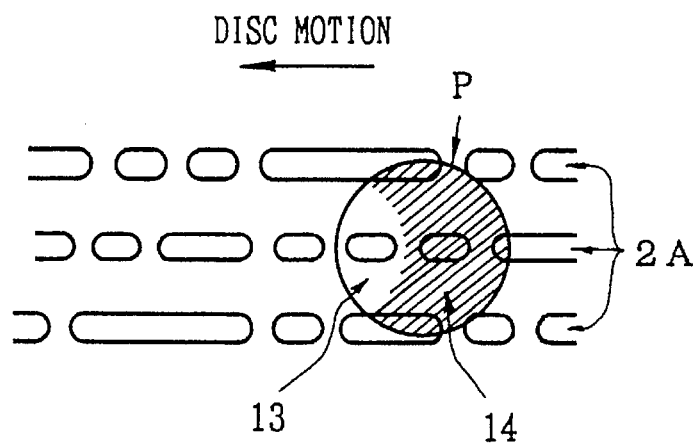
FIG. 7 is a plan view for explaining a rear-aperture type masking effect of the present invention.

FIG. 7 is a plan view for explaining a rear-aperture type masking effect of the present invention.

Referring to FIG. 7, a numeral 13 designates an aperture (effective spot area) causing the light to pass through and 14 a masked portion preventing the light from passing through.

Figure 2:
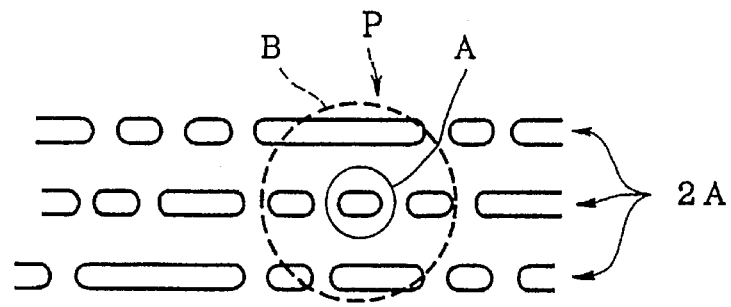
FIG. 2 is a plan view showing a masking effect of a masking layer.
Figure 3:
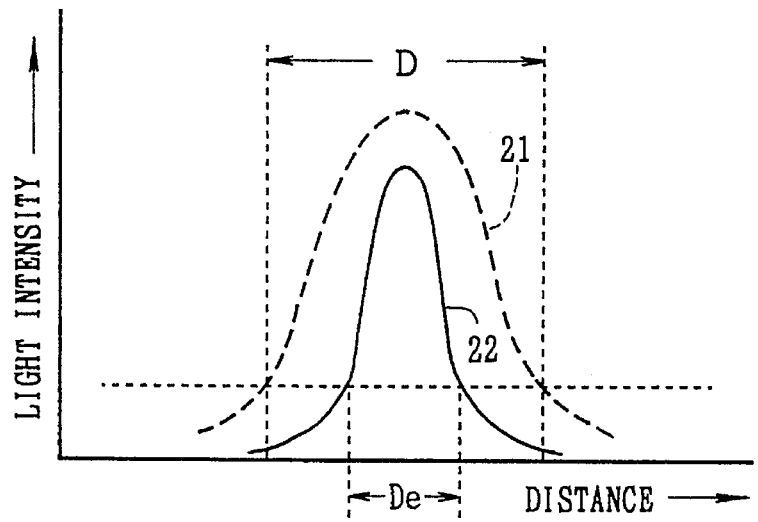
FIG. 3 is a graph showing a relation between an irradiated spot diameter and an effective spot diameter of the laser beam.

It will be understood that the aperture 13 is slightly deviated toward a disc motion direction shown with an arrow from a center of the laser beam spot P because of the response speed within 100 ns in the present invention unlike the case shown in FIG. 2 of the prior art, which is referred to as a rear-aperture type masking effect.

As a result, it was able to cause the laser beam to have a smaller effective spot diameter (area) than the diameter of the laser beam irradiated on the sample.

The same experiments were conducted as to other electron donative color compounds, i.e., ether type bisphenol, bisphenol S, bisphenol S derivative bisphenol A, bisphenol A derivative and dihydroxynaphthalene, and the same results were obtained.

The structural formulas of the electron acceptant developers used in the experiment are shown as follows:

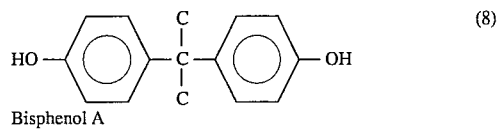

Bisphenol A (8)

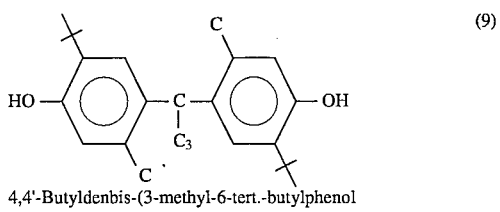

4,4'-Butyldenbis-(3-methyl-6-tert.-butylphenol) (9)

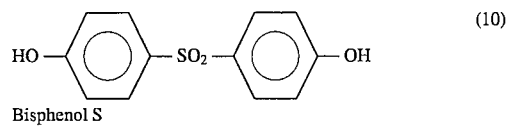

Bisphenol S (10)

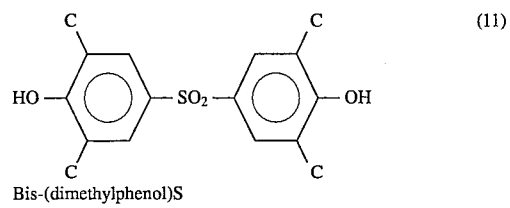

Bis-(dimethylphenol)S (11)

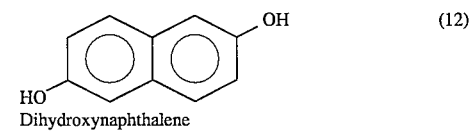

Dihydroxynaphthalene (12)

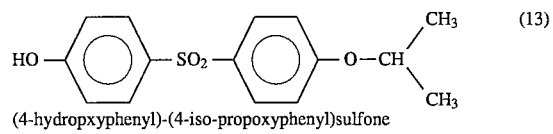

(4-hydropxyphenyl)-(4-iso-propoxyphenyl)sulfone (13)

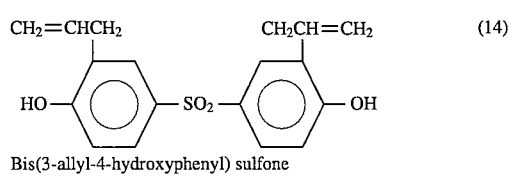

Bis(3-allyl-4-hydroxyphenyl) sulfone (14)

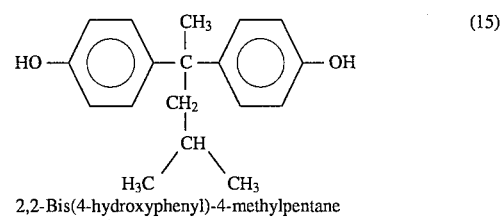

2,2-Bis(4-hydroxyphenyl)-4-methylpentane (15)

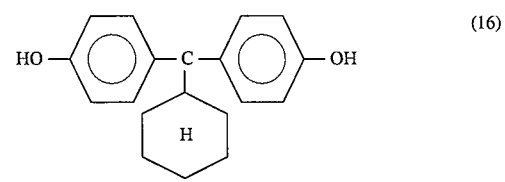

Bis(4-hydroxyphenyl)cyclohexylmethane (16)

-continued

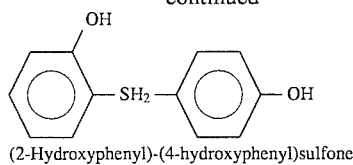

(2-Hydroxyphenyl)-(4-hydroxyphenyl)sulfone     (17)

From the above results, it will be understood that the ether type bisphenol, thioether type bisphenol, bisphenol S, bisphenol S derivative, bisphenol A, bisphenol A derivative, and hydroxynaphthalene are preferable materials for the masking layer 3 permitting to obtain a thin layer to exert an excellent masking effect without degradation of the inherent property of the masking layer even when the vacuum deposition method is employed.

In other words, these electron acceptant developers show the coloring, decoloring and color-change corresponding to In other words, these electron acceptant developers show the coloring, decoloring and color-change corresponding to the change of temperature, the so-called thermochromic phenomenon, by reacting to the electron donative color compound, even when the masking layer 3 is made thinner.

Next, the description is given of embodiments 1~4 of the present invention and comparatives 1~2.

(Embodiment 1)

A reproducing optical disc 1A having the same structure as shown in FIG. 4(A) was obtained by forming the masking layer 3 on the polycarbonate substrate 2 on which the EFM (Eight to Fourteen Modulation) signal is recorded as a series of information pits in a recording density as large as four times of that of CD (Compact Disc) by depositing a mixture of the fluoran type compound GN-169 and the material shown with the formula (6) thereon using the vacuum deposition method ($10^{-5}$ mbar, resistor heating), and by forming the Al reflecting layer 4 of 70 nm on the masking layer 3 using a sputterring method and by forming the protection layer 5 of the photopolymer EX704 on the Al reflecting layer 4 by using the spin-coat method.

(Embodiment 2)

A reproducing optical disc 1B having the same structure as shown in FIG. 4(A) was obtained by forming the masking layer 3 on the same substrate as that of the embodiment 1 by a mixture of the fluoran type compound GN-169 and the material shown with the formula (7) (bisphenol A) thereon using the vacuum deposition method ($10^{-5}$ mbar, resistor heating), and by forming the Al reflecting layer of 70 nm on the masking layer 3 using a spatterring method and by forming the protection layer 5 of the photopolymer EX704 on the Al reflecting layer 4 by using the spin-coat method.

(Embodiment 3)

A reproducing optical disc 1C having the same structure as shown in FIG. 4(A) was obtained by forming the masking layer 3 on the same substrate as that of the embodiment 1 by depositting a mixture of the fluoran type compound GN-169 and the material shown with the formula (9) (bisphenol S) using the vacuum deposition method ($10^{-5}$ mbar, resistor heating), and by forming the Al reflecting layer 4 of 70 nm on the masking layer 3 using a sputterring method and by forming the protection layer 5 of the photopolymer EX704 on the reflecting layer 4 by using the spin-coat method.

(Embodiment 4)

A reproducing optical disc 1D having the same structure as shown in FIG. 4(A) was obtained by forming the masking layer 3 on the same substrate as that of the embodiment 1 by depositing a mixture of the fluoran type compound GN-169 and the material shown with the formula (11) (dihydroxynaphthalene) thereon using the vacuum deposition method ($10^{-5}$ mbar, resistor heating), and by forming the Al reflecting layer 4 of 70 nm on the masking layer 3 using a sputterring method and by forming the protection layer 5 of the photopolymer EX704 on the reflecting layer 4 by using the spin-coat method.

In the above embodiments 1~4, it was employed a dye material having a mixing ratio (weight ratio) of the fluoran type compound GN-196: the electron acceptant developer= 1:1 for the masking layer 3, and a masking layer having a thickness of 800 nm for the masking layer 3.

However, as mentioned hereinafter, it is confirmed that it can be employed a dye material having a mixing ratio of the fluoran type compound GN-169: the electron acceptant developer=1:0.5 to 1:50 and preferable range of 1:1 to 1:5, and a masking layer having a thickness of 50~5000 nm and preferably, 200~4000 nm in the present invention. When the thickness of the masking layer is larger than 5000 nm, transparency of the masking layer becomes too small to obtain reproducing signals.

(Comparative 1)

As a comparative 1, there was prepared a reproducing optical disc (not shown) having no masking layer and having the same construction as that of the embodiment 1 except for the masking layer 3.

(Comparative 2)

As a comparative 2, a reproducing optical disc (not shown) having the same structure as shown in FIG. 4(A) was obtained by forming the masking layer 3 of thickness of 1 μm on the same substrate as that of the embodiment 1 by coating a mixture of the fluoran type compound GN-169 of 1 g and the material of 2 g shown with the formula (6) dissolved in diacetone-alcohol of 30 g thereon using the spin-coat method, and by forming the reflecting layer 4 of Aluminum on the masking layer 3 using a sputterring method and by forming the protection layer 5 of the photopolymer EX704 on the reflecting layer 4 by using the spin-coat method.

The evaluation tests of the reproducing discs on above embodiments 1~4 of and the comparatives 1~2 were conducted by using a reproducing apparatus equipped with an optical pickup emitting a laser beam having a center wavelength of 690 nm and with a lens having the "NA" of 0.6.

Figure 8:
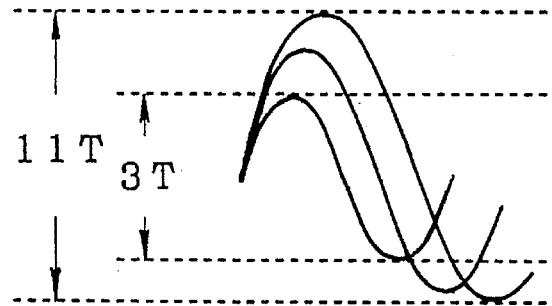
FIG. 8 is a graph for explaining a ratio of the 3T signal amplitude to the 11T signal amplitude of the reproduced waveforms from the optical disc.

The evaluation data were obtained with respect to a ration of the 3T signal amplitude (referred to as I3) to the 11T signal amplitude (referred to as I11) of the reproduced waveform from each of the optical discs of the embodiments 1~4 and the comparatives 1~2 as shown in FIG. 8.

FIG. 8 is a graph for explaining a ratio of the 3T signal amplitude I3 to the 11T signal amplitude I11 of the reproduced waveform from the optical disc.

As to the embodiments 1~4, excellent results were obtained, i.e., the ratio of the 3T signal amplitude I3 to the 11T signal amplitude I11 in the optical disc 1A was 60%, and the ratios in the optical discs 1B~1D were substantially 50%.

On the other hand, as to the comparative 1, a poor result was obtained, i.e., the ratio I3/I11 in the comparative 1 was about 30%, which corresponds to substantially a half of the ratio of the embodiment 1.

With respect to the comparative 2, it was unable to reproduce the signal from the optical disc because the information pits were filled with the dye material coated by the spin-coat method.

TABLE 1

| Developer (C. formulas No.) | Thickness of mask (nm) | I3 / I11 (%) |
| --- | --- | --- |
| 7 | 800 | 69 |
| 9 | 1000 | 62 |
| 10 | 800 | 60 |
| 11 | 800 | 57 |
| 12 | 800 | 55 |
| 13 | 1000 | 67 |
| 14 | 800 | 70 |
| 15 | 1000 | 67 |
| 16 | 1300 | 58 |
| 17 | 800 | 69 |

*electron donative color compound: GN-169
**the ratio of the electron donative color compound to the developer = 1: 0.5~2

Table 1 shows results of relations between thicknesses and the amplitude ratio of the I3/I11 of other embodiments of the developers shown with the constructive formulas in the present invention.

TABLE 2

| mixing ratio of developer to elec. dona. color com. | I3 / I11 (%) |
| --- | --- |
| 0.5 | 62 |
| 0.7 | 68 |
| 1.0 | 72 |
| 1.5 | 74 |
| 2.0 | 71 |
| 2.5 | 69 |
| 3.0 | 67 |
| 3.5 | 66 |
| 4.0 | 64 |
| 4.5 | 61 |
| 5.0 | 59 |
| 5.5 | 54 |
| 6.0 | 50 |
| 6.5 | 45 |
| 7.0 | 40 |

*electron donative color compound: GN-169
**developer: BPA (bisphenol)
***mixing ratio: weight ratio Table 2 shows examples of relations between mixing ratios of a developer (BPA) to an electron donative color compound (GN-169) and amplitude ratios of I3 to I11 in the present invention.

Generally, as to the mixing ratio of the developer to the electron donative color compound, the coloring density changes corresponding to combinations of them, thus a preferable mixing ratio is not always constant. If the desirable color density is obtained, any mixing ratio is acceptable, however, it should be noted that an excessive amount of the developer that does not contribute to the substantial coloring, is harmful because it requires useless thermal energy for the decoloring of the excessive amount of the developer.

For example, in a combination of GN-169 and BPA shown in Table 2, when the mixing ratio of BPA to GN-169 is larger than 5 (weight ratio), the characteristic of I3/I11 is extremely degraded.

As a result of the experiments, the masking layer can be uniformly formed on the uneven surface of the optical disc by using the vacuum deposition method and the dye material of the mask layer exerts a sufficient masking effect.

As will be understood from the above description, it is able to detect the information pits having smaller diameters than that of the spot of the laser beam from the optical disc 3 by providing the masking layer on the optical disc by using the vacuum deposition method.

In the writable optical discs (write-once version or erasable and writable version), it is able to form recording marks having smaller diameters than that of the spot of the laser beam by controlling the power of the laser beam, as mentioned in the foregoing. Thus, it is able to write the recording marks on the optical disc in a high density and also able to reproduce the recording marks from the optical disc.

In the above embodiments, while the vacuum deposition method is employed in the producing of the masking layer 3, it is to be understood that other production method of the masking layer can be employed as long as the uniform thin film having a predetermined thickness can be formed as the masking layer 3.

The masking layer 3 of the present invention is also applicable to such a recording medium as a card-type one and a tape-type one as well as the optical discs.

According to the optical recording medium of the present invention, an optical recording medium has a masking layer made of a thermochromic material composed of an electron donative color compound and a electron acceptant developer, which enables to provide a masking layer having a large coloring density.

Specifically, it is able to provide a masking layer having an excellent response characteristic to the laser beam even when the thickness of the masking layer is very thin by employing the bisphenol type developer and hydroxynaphthalene type developer as the electron acceptant developer. Further, the masking layer allows the coloring and decoloring without equipping a complex lens system on the apparatus.

Further, it is able to form the uniform masking layer on the uneven surface of the transparent substrate by using the vacuum deposition method.

What is claimed is:

1. An optical recording medium comprising:

a transparent substrate having at least a series of information pits provided thereon, said series of information pits being able to be read out as reproducing signals by being irradiated with a laser beam from an apparatus; and a masking layer provided on the transparent substrate by vacuum deposition means for minimizing an effective spot diameter of the laser beam to pass through the masking layer, said masking layer having a transmittance reversely changeable corresponding to a change of temperature by being irradiated with the laser beam, said masking layer is made of a thermochromic material consisting of an electron donative color compound and an electron acceptant developer having a sublimation point or boiling point to allow an evaporation thereof in a molecular state.

2. An optical recording medium as claimed in claim 1 further comprises guide grooves for controlling recording operation of said series of information pits.

3. An optical recording medium as claimed in claim 1, wherein said electron acceptant developer has both an electron acceptant developing function and a decoloring function to the electron donative color compound.

4. An optical recording medium as claimed in claim 1, wherein said electron acceptant developer is a compound having a bisphenol structure.

5. An optical recording medium as claimed in claim 4, wherein said bisphenol type developer is at least one of ether type bisphenol, thioether type bisphenol, bisphenol S, bisphenol S derivative, bisphenol A, bisphenol A type compound and bisphenol A derivative.

6. An optical recording medium as claimed in claim 1, wherein said electron acceptant developer is hydroxynaphthalene type developer.

7. An optical recording medium comprising:

a transparent substrate having guide grooves for controlling operation of recording a series of information pits which can be read out as reproducing signals by being irradiated with a laser beam from an apparatus; and a masking layer provided on the transparent substrate by vacuum deposition means for minimizing an effective spot diameter of the laser beam to pass through the masking layer, said masking layer having a transmittance reversely changeable corresponding to a change of temperature by being irradiated with the laser beam, said masking layer is made of a thermochromic material consisting of an electron donative color compound and an electron acceptant developer having a sublimation point or boiling point to allow an evaporation thereof in a molecular state.

8. An optical recording medium as claimed in claim 7, wherein said electron acceptant developer has both an electron acceptant developing function and a decoloring function to the electron donative color compound.

9. An optical recording medium as claimed in claim 7, wherein said electron acceptant developer is a compound having a bisphenol structure.

10. An optical recording medium as claimed in claim 9, wherein said a compound having a bisphenol structure is at least one of ether type bisphenol, thioether type bisphenol, bisphenol S, bisphenol S derivative, bisphenol A, bisphenol A type compound and bisphenol A derivative.

11. An optical recording medium as claimed in claim 7, wherein said electron acceptant developer is hydroxynaphthalene type developer.

* * * * *